United States Patent [19]

Lesslie et al.

[11] Patent Number: 5,215,480
[45] Date of Patent: Jun. 1, 1993

[54] ELECTRONIC CIRCUIT INTERRUPTER WITH ATTACHED TERMINAL CONNECTOR BLOCK

[75] Inventors: David J. Lesslie, Plainville; Marshall B. Hart, Middletown; Andrew M. Candelora, East Haven; Dennis J. Doughty; Raymond K. Seymour, both of Plainville; Thomas M. Palmer, Wallingford, all of Conn.

[73] Assignee: General Electric Company, New York, N.Y.

[21] Appl. No.: 852,115

[22] Filed: Mar. 16, 1992

Related U.S. Application Data

[62] Division of Ser. No. 674,475, Mar. 25, 1991, abandoned.

[51] Int. Cl.⁵ .............................................. H01R 9/22
[52] U.S. Cl. .................................. 439/709; 439/696; 361/394
[58] Field of Search ............... 439/709, 712, 714, 718, 439/719, 701, 690, 696, 723, 724, 713, 610, 931, 76, 607, 695; 361/394, 344, 395, 335

[56] References Cited

U.S. PATENT DOCUMENTS

| | | | |
|---|---|---|---|
| 3,323,021 | 5/1967 | Sever | 439/709 |
| 3,566,191 | 2/1971 | Holst | 361/394 |
| 3,579,046 | 5/1971 | Jordan | 439/76 |
| 4,094,571 | 6/1978 | Benjamin | 439/188 |
| 4,272,148 | 6/1981 | Knack, Jr. | 439/610 |
| 4,286,835 | 9/1981 | Adams et al. | 439/76 |
| 4,514,029 | 4/1985 | Lax et al. | 439/931 |
| 4,626,962 | 12/1986 | Ahn et al. | 361/394 |
| 4,689,718 | 8/1987 | Maue et al. | 439/76 |
| 4,811,168 | 3/1989 | Chesnut et al. | 439/76 |
| 5,053,199 | 10/1991 | Keiser et al. | 439/76 |

Primary Examiner—Larry I. Schwartz
Assistant Examiner—Hien D. Vu
Attorney, Agent, or Firm—Richard A. Menelly

[57] ABSTRACT

Low voltage electric switchgear equipment includes a central processor unit electrically interconnected with electronic main and branch circuit interrupters within the same enclosure and used within a multi-phase power distribution circuit. A terminal connector block is connected by cable with each of the electronic trip units within the branch circuit interrupters to provide communications between the branch circuit interrupters and the main circuit interrupter for continuously updating the status of the branch circuit interrupters and their associated electrical equipment. Strain relief is provided to the cable connecting between the terminal connector block and the branch circuit interrupter to prevent damage to the electrical components within the electronic trip unit that are internally connected with the cable.

2 Claims, 4 Drawing Sheets

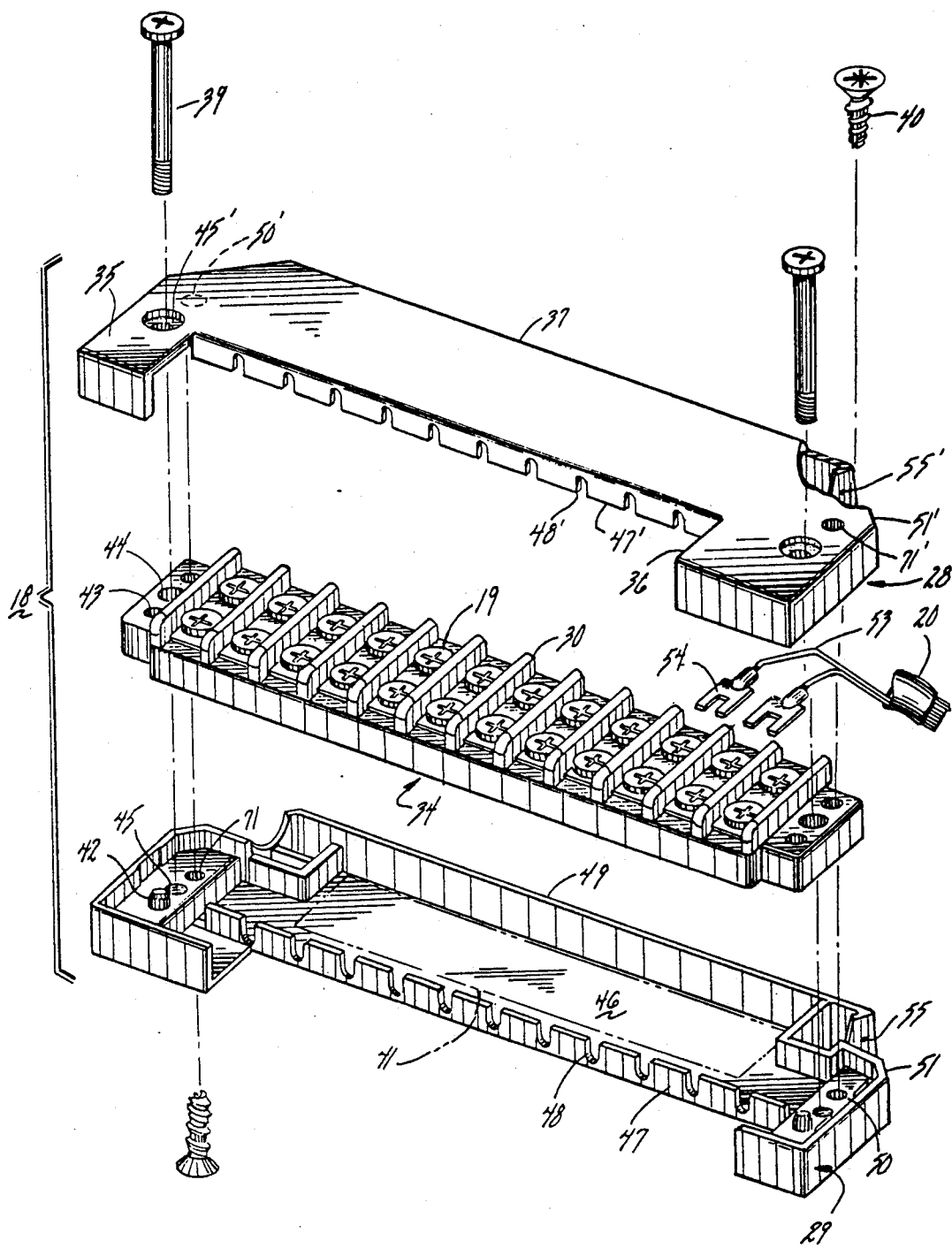

ELECTRONIC CIRCUIT INTERRUPTER WITH ATTACHED TERMINAL CONNECTOR BLOCK

This is a divisional of application Ser. No. 07/674,475, filed Mar. 25, 1991 now abandoned.

BACKGROUND OF THE INVENTION

The advent of "smart" circuit interrupters, such as described within U.S. Pat. No. 4,672,501 permits several such circuit interrupters arranged within a common enclosure to communicate with a central processor unit over a power line communication network or a twisted pair of conductors. The central processor is in the form of a field programming unit which continuously interrogates each of the interconnected circuit interrupters to determine the status of the individual circuit interrupter setpoint parameters as well as to determine whether a circuit interrupter has responded to interrupt circuit current to an associated piece of electrical equipment. An operator could then readily determine from the field programming unit which of the circuit interrupters has responded and the nature and magnitude of the overcurrent condition causing the circuit interrupter to respond.

In certain industrial environments, it is customary to assemble a main circuit interrupter along with several branch circuit interrupters within a common enclosure such as within low voltage switchgear applications. The field programming unit is arranged within the enclosure and is interconnected with the main and branch circuit interrupters by means of a communications link to allow the condition and status of each of the circuit interrupters and the associated protected electrical equipment to be continuously monitored. The branch circuit interrupters communicate with each other, the field programming unit and the main circuit interrupter for a variety of functions including Zone Selective Interlock such as described, for example, in U.S. Pat. No. 4,468,714. With Zone Selective Interlock function an upstream circuit interrupter is delayed from operating to interrupt circuit current to allow a downstream circuit interrupter closer to the fault to interrupt the circuit. The trip-time characteristics of the individual branch circuit interrupters can be independently adjusted to insure that the circuit interrupter closest to the fault will interrupt before any of the upstream circuit interrupters. The use of such a communications link between the main and branch circuit interrupters within a common enclosure was heretofore limited to so-called "medium voltage" circuit interrupters having a voltage rating in the order of ten or more killovolts. The proposed use of electronics in "low voltage" circuit interrupters in the order of several hundred volts, would allow such low voltage circuit interrupters to communicate with each other by means of a similar communications link.

One purpose of the invention accordingly is to provide means for communication between low voltage circuit interrupters without affecting the circuit interrupter overcurrent determination.

SUMMARY OF THE INVENTION

A low voltage circuit interrupter employing an electronic trip unit is electrically connected with a terminal connector by means of a multi-wire electrical cable. The terminal connector accordingly provides interconnection with associated electronic circuit interrupters for communications and supplemental control functions.

BRIEF DESCRIPTION OF THE DRAWINGS

FIG. 3 is a top perspective view of the terminal connector block of FIG. 2 prior to assembly;

DESCRIPTION OF THE PREFERRED EMBODIMENT

Figure 1:
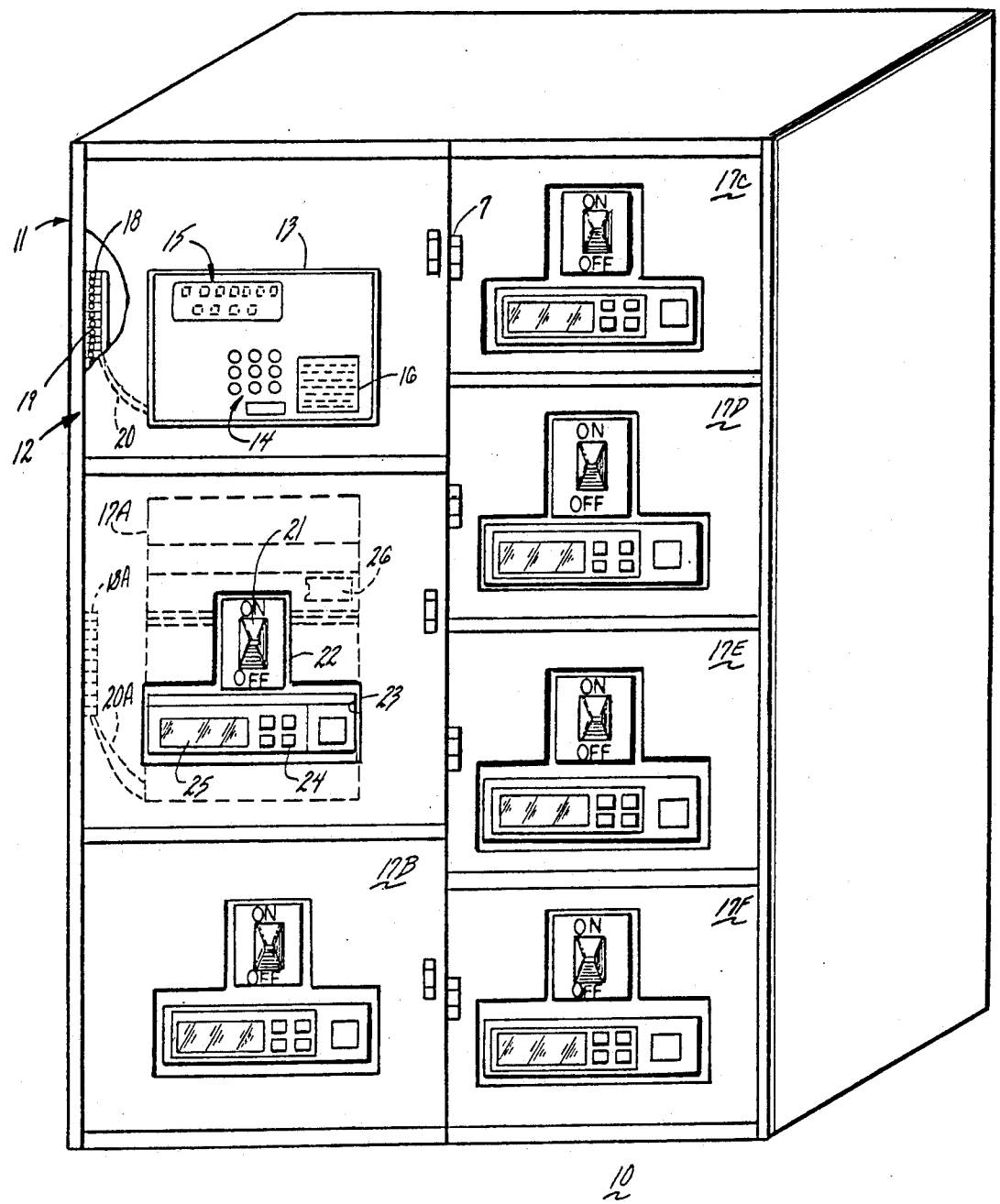
FIG. 1 is a front view of a switchgear equipment enclosure containing low voltage circuit interrupters interconnected by means of terminal connector blocks in accordance with the invention.

A low voltage switchgear assembly 10 is shown in FIG. 1 and consists of a metal enclosure 11 that is subdivided into a plurality of individual compartments 12. The field programming unit 13 is arranged within one of the compartments such that the keypad 14 and display 15 are accessible from the exterior of the enclosure. Indicia 16 provides instruction for displaying the status and setpoint information stored within each of the circuit interrupters 17A-17F arranged within separate compartments. The circuit interrupters are similar to those described in U.S. Pat. No. 4,991,042 and each includes an operating handle 21 accessible from the exterior of the compartment to turn the circuit interrupter contacts to their "ON" and "OFF" positions.

A keypad 24 and a display 25 are accessible from the exterior of the compartment for inputting and reviewing the setpoint data stored within the circuit interrupter electronic trip unit. An inverted T-shaped slot 23 is formed through each of the compartments 12 through which the handle escutcheon 22, handle operator 21, keypad 24 and display 25 project. The rating plug 26 that sets the circuit interrupter ratings is only accessible by means of the compartment handle, such as indicated at 7 and which can be padlocked to prevent access to the circuit interrupter rating plug and also to the terminal connector block 18 that is mounted on the side wall of the enclosure 11. The terminal connector block includes a plurality of terminal connectors 19 and connects with the field programming unit 13 as well as with the individual circuit interrupters 17A-17F by means of cables 20. Each of the individual circuit interrupters has a corresponding terminal connector block such as indicated at 18A which is connected with its associated circuit interrupter by means of a separate cable as indicated at 20A. As described earlier, the electrical interconnection by means of the individual terminal connector blocks 18 allows the field programming unit to continuously interrogate the interconnected circuit interrupters to determine the status of the individual setpoint parameters and to also determine whether any of the circuit interrupters has responded to interrupt the circuit current to an associated piece of electrical equipment. Although the circuit interrupter and associated terminal block are described herein for use within switchgear equipment, this is by way of example only. The circuit interrupter can be mounted, per se, outside an electrical enclosure for communication with distant circuit interrupters over a power line communications network for data acquisition, interlock and metering functions.

Figure 2:
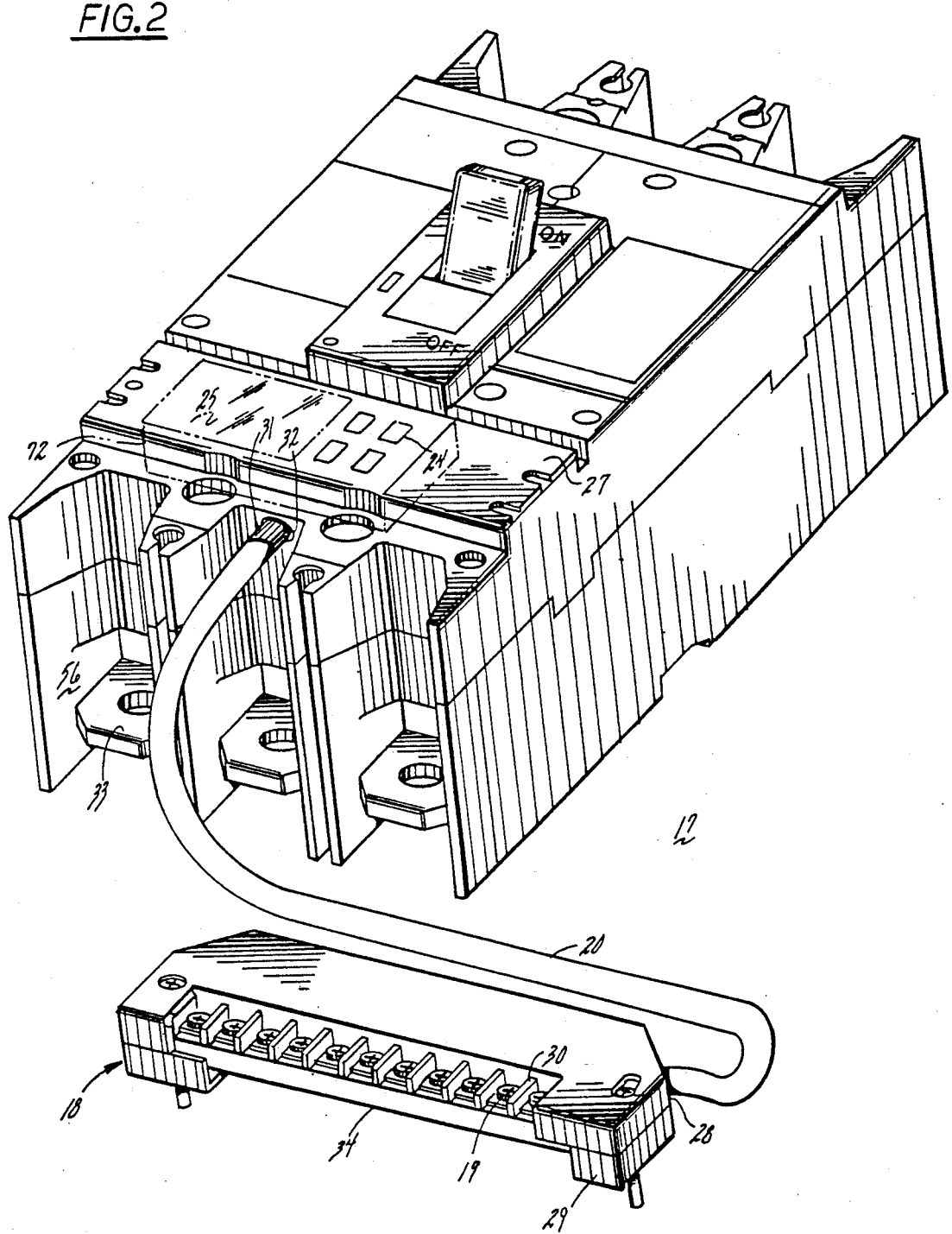
FIG. 2 is a top perspective view of a main circuit interrupter containing one of the terminal connector blocks in accordance with the invention.

A circuit interrupter 17 is shown in FIG. 2 and is similar to that described in aforementioned U.S. Pat. No. 4,991,042 wherein the keypad 24 and display 25 are arranged under a protective plastic plate as indicated at 27. The circuit interrupter further includes a terminal connector block 18 which is connected with the circuit interrupter by means of a cable 20. To provide strain relief to the cable-circuit interrupter connection, a flanged eyelet 31 is positioned over the cable and is inserted within a circular access slot 32 formed within the circuit interrupter housing. The process of inserting the flanged eyelet 31 will be described below in greater detail. The terminal connector block 18 includes a plurality of terminal connectors 19 that are arranged on a continuous terminal strip 34 and are electrically isolated from each other by means of the terminal barriers 30 integrally-formed thereon. The terminal connector block is formed from a top insulating plate 28 and a bottom insulating plate 29 formed from a plastic or similar electrical insulating material. As best seen by referring to FIG. 3, the terminal connector block 18 is pieced together by forming the top and bottom plates 28, 29 from a common design such that each is an exact duplicate of the other. The bottom plate 29, for example, is arranged such that the front wall 47 upstanding from the bottom 46 contains a series of U-shaped grooves 48 and is separated from the taller back wall 49 by the bottom 46. The terminal strip 34 is arranged over the bottom plate 29 and is positioned thereon by arranging the tapered locating holes 43 on opposite ends of the terminal strip over corresponding tapered locating posts 42 formed on the opposite ends of the bottom plate 29. The locating posts are received within the locating holes in a press-fit relation to help position and support the terminal strip upon the bottom plate. A printed circuit board 41 can be arranged on the bottom 46 intermediate the front and back walls 48, 49 before positioning the terminal strip on the bottom if such printed circuit board is desired. When the terminal strip is positioned over the bottom 46 and the printed circuit board 41, the U-shaped grooves 48 provide venting for the printed circuit board to prevent the printed circuit board from becoming over-heated under adverse thermal operating conditions. The lugs 54 at the ends of the wire conductors 53 within the cable 20 are then fastened to the terminal strip by means of the terminal connectors 19 and are electrically isolated by means of the terminal barriers 30. To attach the top and bottom plates 28, 29 and the terminal strip 34, a pair of thread-cutting screws 40 pass through a pair of thru-holes 71, 71' formed at the opposite ends of the top and bottom plates and are received within corresponding openings 50 and 50' formed on the interior surface of the top and bottom plates. The thru-holes 44 at opposite ends of the terminal strip correspondingly align with thru-holes 45 at opposite ends of the bottom plate 29 and thru-holes 45' at the opposite ends of the top plate 28 to receive the self-captivated terminal block mounting screws 39 that also pass through the thru-holes 44 formed at the opposite ends of the terminal strip 34. As indicated, the top plate 28, which is an exact duplicate of the bottom plate 29, has a C-shaped configuration consisting of a top leg 35 and a bottom leg 36 that extend parallel to each other and are joined by the extended bight portion 37 and corresponding slots 48' formed through a corresponding front wall 47' as indicated. The corners of the C are slanted as indicated at 51, 51' to allow the assembled communications terminal connector block 18 to be arranged in close proximity to the associated electronic circuit interrupter or walls of the associated electrical enclosure. The complementary slots 55, 55' are formed within the slanted corners 51, 51' such that the cable 20 is clamped between the top plate 28 and the bottom plate 29, providing the necessary strain relief.

Figure 5:
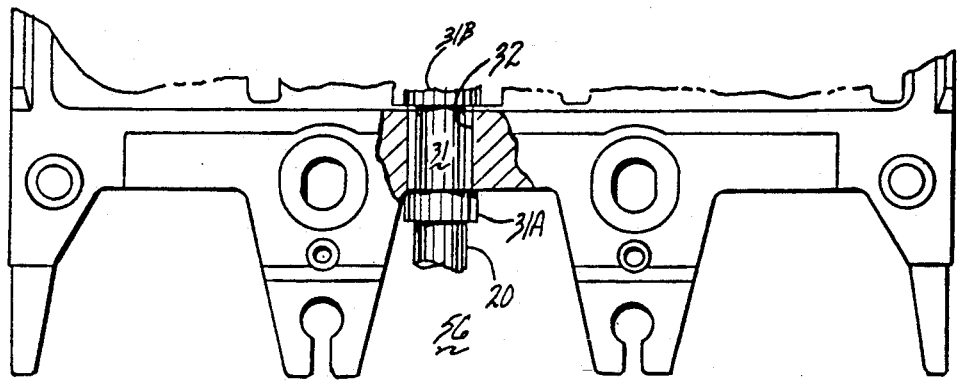
FIG. 5 is a top plan view in partial section of one end of the circuit interrupter depicted in FIG. 4.
Figure 4:
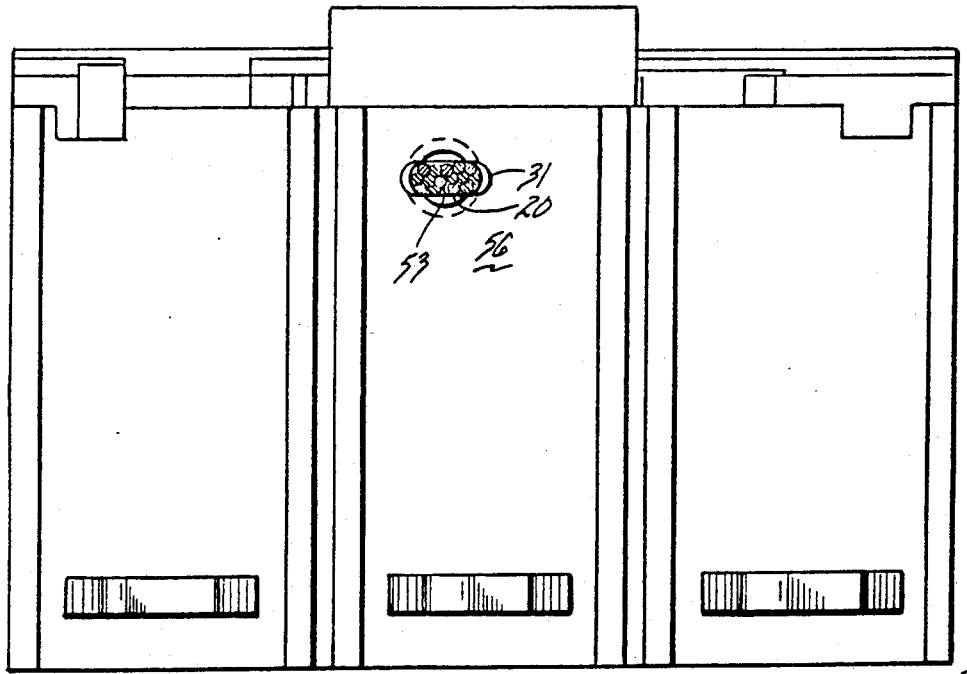
FIG. 4 is a bottom plan view of the low voltage circuit interrupter of FIG. 2.

As best seen by referring to the circuit interrupter 17 shown in FIGS. 2 4 and 5, the flanged eyelet 31 is shown passing through the aperture 32 formed within the enclosure wall within the compartments 56 that enclose the terminal lugs 33. The cable 20 extends through the eyelet 31 which is positioned within the slot and is deformed at its ends to produce the formed-over oval parts 31A, 31B. The eyelet is accordingly pressed onto the cable and thereby retains the cable within the aperture. When lateral force is applied to the cable, the eyelet prevents displacement of the wire conductors 53 carried within the cable 20 from being displaced from electrical connection with the printed circuit board 72 contained within the circuit interrupter enclosure. Alternatively, the aperture 32 can be slotted to allow the eyelet and cable to be down-loaded within the aperture prior to deforming the ends of the eyelet to facilitate assembly of the cable to the circuit interrupter case.

Having thus described our invention, what we claim as new and desire to secure by Letters Patent is:

1. A terminal board connector comprising:

a top plate comprised of insulating material and defining a pair of top end pieces integrally-joined by a top bight piece;

a bottom plate comprised of said insulating material and defining a pair of bottom end pieces joined by a bottom bight piece;

a terminal board comprised of said insulating material and including a plurality of terminal connectors arranged on one surface thereof, said top and bottom plates being fastened together to trap said terminal board intermediate said top and bottom plates, said top and bottom plates include a slot for receiving a multi-wire conductor cable; and said cable being trapped between said top and bottom plates to thereby prevent removal of said cable from said top and bottom plates, said top and bottom plates include a front wall including a plurality of wire receiving slots formed therein.

2. The terminal board of claim 1 wherein said top and bottom plates further include a rear wall opposite from said front wall and extending upwards from a bottom surface extending between said front and rear walls a greater distance than said front wall.

* * * * *